Patented Apr. 23, 1935

1,998,595

UNITED STATES PATENT OFFICE 1,998,595

PRODUCTION OF LIQUID HYDROCARBONS OF THE BENZENE SERIES

Walter Speer and Walter Flemming, Ludwigshafen-on-the-Rhine, Germany, assignors to I. G. Farbenindustrie Aktiengesellschaft, Frankfort-on-the-Main, Germany No Drawing. Application March 26, 1932, Serial No. 601,458. In Germany April 13, 1931

2 Claims. (Cl. 260—168)

The present invention relates to improvements in the production of liquid hydrocarbons of the benzene series.

It is already known that polynuclear aromatic hydrocarbons, especially naphthalene, may be converted into liquid hydrocarbons having a smaller number of carbon atoms in the molecule, especially benzene and toluene, by thermal treatment with hydrogen under pressure.

We have now found that naphthalene is converted into liquid hydrocarbons of the benzene series (including hydrogenated hydrocarbons of the benzene series) having substantially an unchanged number of carbon atoms in the molecule, such as diethylbenzene and methyl propyl benzene and the corresponding substances having a wholly or partly hydrogenated nucleus, by first treating the naphthalene with hydrogen under a pressure of between 50 and 350 atmospheres, for example under 100 or 200 atmospheres or more, in the presence of catalysts comprising an oxide of a metal selected from the group consisting of molybdenum and tungsten at comparatively low temperatures, ranging from 340° to 440° C., and then treating the resulting product, preferably without condensing it, with hydrogen under a pressure of the above range, at higher temperatures ranging from 460° to 500° C. in the presence of catalysts comprising an oxide of a metal selected from the group consisting of molybdenum and tungsten.

Crude naphthalene or mixtures containing naphthalene, as for example a solution of naphthalene in tetrahydronaphthalene, may be employed as initial materials instead of pure naphthalene.

In the first stage of the reaction, in which a partial hydrogenation of the naphthalene takes place, mixtures of molybdenum or tungsten oxides with difficultly reducible metal oxides, as for example zinc oxide and magnesium oxide, except the oxides of the alkali and alkaline earth metals, or with readily reducible oxides, such as nickel oxide and cobalt oxide, except the oxides of mercury, thallium, tin and lead, or mixtures which contain both difficultly and readily reducible oxides as well as the oxides of tungsten or molybdenum or both, are advantageously employed as catalysts. In the second stage which is carried out at higher temperatures one nucleus of the nahpthalene molecule is split up to form side chains of the other nucleus and further hydrogenation occurs. In the second stage catalysts which contain at least one readily reducible oxide of a metal melting above 400° C., such as copper oxide, in addition to molybdenum or tungsten oxides or both are most suitable. It is also possible, however, to use the same catalyst in both stages of the reaction and to produce the desired action solely by alteration in temperature, the extent of which depends on the catalysts selected and is readily ascertainable by a preliminary test. Catalysts having a very strong hydrogenating effect such as mixtures of nickel oxide and molybdenum oxide or of zinc oxide and molybdenum oxide permit operation in the first stage at relatively low temperatures such as 340° to 360° C. Catalysts having a very strong splitting action such as mixtures of titanium oxide and molybdenum oxide or copper oxide and molybdenum oxide render it possible to carry out the second stage at relatively low temperatures such as 460° to 480° C. The proportions of the constituents of such mixtures may vary in wide limits; a mixture of 0.5 molecular weight of copper oxide and 1 molecular weight of molybdenum oxide is very suitable for the second stage. The second stage always requires higher temperatures than the first stage however. The pressure is advantageously about 200 atmospheres or more, but smaller pressures, as for example 100 atmospheres, may be successfully employed.

The reaction is preferably carried out continuously and without condensing or isolating the intermediate products formed in the first stage of the reaction. In some cases it may be advantageous, however, to isolate the intermediate products. For example when crude naphthalene is hydrogenated in the first stage in the presence of catalysts immune to poisoning by sulphur such as a mixture of zinc oxide and molybdic acid anhydride, the products arising from the first reaction stage are cooled and washed with a solution of sodium hydroxide in order to remove the hydrogen sulphide formed. In the second stage the desulphurized product may then be treated with hydrogen under pressure in the presence of catalysts more sensitive to poisoning by sulphur, such as readily reducible oxides in admixture with the anhydrides of molybdic or tungstic acid.

By means of the process according to the present invention it is posible to convert naphthalene, which is cheap, into a mixture of valuable liquid homologues of benzene without any appreciable waste by reason of the formation of gaseous hydrocarbons.

The products obtained may be employed for many purposes, as for example as solvents or as additions to knocking motor fuels to prevent knocking.

The following examples will further illustrate the nature of this invention but the invention is not restricted to these examples.

*Example 1*

300 liters (reckoned at ordinary pressure and temperature) of a mixture of 15 volumes of hydrogen and 1 volume of naphthalene vapor are led per hour under a pressure of 200 atmospheres and at 400° C. over 50 cubic centimeters of a catalyst prepared by mixing zinc oxide, magnesium oxide and molybdic acid in the molecular proportions 1:½:1 with water to form a paste, drying the paste at 150° C. and treating it with hydrogen at 500° C. The mixture of gas and vapor leaving the reaction chamber is led directly into a second reaction chamber and passed under the same pressure at 480° C. over a catalyst containing ½ molecular proportion of copper oxide to each molecular proportion of molybdic acid and being prepared by mixing the oxides with water to form a paste and drying the latter at 150° C.

The reaction product consists exclusively of liquid hydrocarbons which contain 60 per cent of homologues of benzene, mainly diethyl benzene and methyl propyl benzene, as well as about 5 per cent of aliphatic hydrocarbons and about 30 per cent of tetra- or deca-hydronaphthalene.

*Example 2*

Crude naphthalene is evaporated and passed at 360° C. together with 15 times its volume of hydrogen passed under a pressure of 200 atmospheres over a catalyst consisting of zinc oxide and molybdenum oxide in equal molecular proportions, which has been previously reduced with hydrogen at 500° C. The hot vaporous mixture is then passed at 460° C. over a second catalyst, consisting of titanium oxide and molybdenum oxide in equal molecular proportions, which has been previously reduced with hydrogen at 500° C. The liquid reaction products are separated. They consist to an extent of about 20 per cent of homologues of benzene and their hexahydro derivatives, mainly diethyl benzene, methyl propyl benzene and the corresponding hexahydro compounds. The remaining part of the reaction products consists of decahydronaphthalene, tetrahydronaphthalene and small amounts of hydrogenated homologues of benzene other than the aforementioned.

*Example 3*

A mixture of vaporized crude naphthalene is mixed with 15 times its volume of hydrogen. This mixture is passed at 200 atmospheres through two reaction chambers from which one, into which the reaction mixture enters, first is heated up to 420° C. and the other, into which the reaction products enter directly after leaving the first chamber, is heated to 490° C., both reaction chambers containing a catalyst prepared from ammonium tungstate by treatment with hydrogen at 500° C., under pressure. The liquid reaction product consists to an extent of 15 per cent of homologues of benzene containing 10 carbon atoms and their hexahydro derivatives.

What we claim is:

1. A process for the conversion of naphthalene into liquid hydrocarbons of the benzene series having substantially an unchanged number of carbon atoms in the molecule which comprises hydrogenating a substance comprising naphthalene by treatment with hydrogen under a pressure between 50 and 350 atmospheres at a temperature between 340° and 440° C. in the presence of a catalyst comprising essentially a mixture of an oxide of a metal selected from the group consisting of molybdenum and tungsten, and of an oxide of a metal selected from the group consisting of zinc and magnesium, and then treating the resulting product with hydrogen under a pressure of the above range at a temperature between 460° and 500° C. in the presence of a catalyst comprising essentially a mixture of an oxide of a metal selected from the group consisting of molybdenum and tungsten, and of a readily reducible oxide of a metal melting above 400° C.

2. A process for the conversion of naphthalene into liquid hydrocarbons of the benzene series having substantially an unchanged number of carbon atoms in the molecule which comprises hydrogenating a substance comprising naphthalene by treatment with hydrogen under a pressure between 50 and 350 atmospheres at a temperature between 340° and 440° C. in the presence of a catalyst comprising essentially a mixture of an oxide of a metal selected from the group consisting of molybdenum and tungsten, and of an oxide of a metal selected from the group consisting of zinc and magnesium, and then treating the resulting product with hydrogen under a pressure of the above range at a temperature between 460° and 500° C. in the presence of a catalyst comprising essentially a mixture of an oxide of a metal selected from the group consisting of molybdenum and tungsten, and of a copper oxide.

WALTER SPEER.
WALTER FLEMMING.